US012465794B2

(12) United States Patent
Staszak

(10) Patent No.: US 12,465,794 B2
(45) Date of Patent: Nov. 11, 2025

(54) ADJUSTABLE FOG JET NOZZLE

(71) Applicant: Tyco Fire Products LP, Lansdale, PA (US)

(72) Inventor: Adam M. Staszak, Marinette, WI (US)

(73) Assignee: Tyco Fire Products LP, Cranston, RI (US)

(*) Notice: Subject to any disclaimer, the term of this patent is extended or adjusted under 35 U.S.C. 154(b) by 461 days.

(21) Appl. No.: 17/777,493

(22) PCT Filed: Dec. 30, 2020

(86) PCT No.: PCT/IB2020/062555
§ 371 (c)(1),
(2) Date: May 17, 2022

(87) PCT Pub. No.: WO2021/137179
PCT Pub. Date: Jul. 8, 2021

(65) Prior Publication Data
US 2022/0401772 A1 Dec. 22, 2022

Related U.S. Application Data

(60) Provisional application No. 62/956,972, filed on Jan. 3, 2020.

(51) Int. Cl.
*A62C 31/03* (2006.01)
*A62C 99/00* (2010.01)
*B05B 1/30* (2006.01)

(52) U.S. Cl.
CPC .......... *A62C 31/03* (2013.01); *A62C 99/0072* (2013.01); *B05B 1/3073* (2013.01)

(58) Field of Classification Search
CPC ..... B05B 1/306; B05B 1/3066; B05B 1/3073; B05B 1/308; A62C 31/03
(Continued)

(56) References Cited

U.S. PATENT DOCUMENTS

| | | | | |
|---|---|---|---|---|
| 2,988,289 A * | 6/1961 | Thompson | B05B 1/12 | 239/456 |
| 3,554,452 A * | 1/1971 | Davidson | A62C 31/02 | 239/456 |

(Continued)

FOREIGN PATENT DOCUMENTS

| | | |
|---|---|---|
| WO | WO-02/26393 A1 | 4/2002 |
| WO | WO-2011/115673 A1 | 9/2011 |
| WO | WO-2019/017782 A1 | 1/2019 |

OTHER PUBLICATIONS

U.S. Patent and Trademark Office as International Searching Authority; International Search Report and Written Opinion; PCT/IB2020/062555; dated May 19, 2021; 8 pages.

*Primary Examiner* — Cody J Lieuwen
(74) *Attorney, Agent, or Firm* — Foley & Lardner LLP

(57) ABSTRACT

A nozzle includes an inlet end having one or more inlet apertures and an outlet end having one or more outlet apertures. The nozzle includes a body member that extends between the inlet end and the outlet end. In some embodiments, the nozzle includes a central member that extends centrally through the body member. The nozzle includes an end member fixedly coupled with the central member at the outlet end. The nozzle includes a slidable member translatably coupled with the central member. The slidable member is configured to direct fluid that flows through the body member outwards towards an inner surface of the body member and translation of the slidable member adjusts a K-factor of the nozzle.

19 Claims, 7 Drawing Sheets

(58) Field of Classification Search
USPC .................................................. 239/456, 541
See application file for complete search history.

(56) References Cited

U.S. PATENT DOCUMENTS

| | | | | |
|---|---|---|---|---|
| 3,684,192 | A * | 8/1972 | McMillan .............. | A62C 31/02 239/452 |
| 7,464,766 | B2 | 12/2008 | Crabtree et al. | |
| 7,784,709 | B1 * | 8/2010 | Williams ............... | A62C 31/12 239/533.1 |
| 2006/0102749 | A1 * | 5/2006 | Crabtree ................ | A62C 31/02 239/533.1 |
| 2009/0020629 | A1 * | 1/2009 | Marino ..................... | B05B 1/30 251/231 |
| 2020/0179736 | A1 * | 6/2020 | Verschoor .............. | A62C 35/68 |

* cited by examiner

ADJUSTABLE FOG JET NOZZLE

CROSS-REFERENCE TO RELATED PATENT APPLICATION

This application claims the benefit of and priority to U.S. Provisional Patent Application No. 62/956,972, filed Jan. 3, 2020, the entire disclosure of which is incorporated by reference herein.

BACKGROUND

The present disclosure relates to fire suppression systems and nozzles. More particularly, the present disclosure relates to adjustable fire suppression nozzles.

SUMMARY

One implementation of the present disclosure is a nozzle (e.g., for fire suppression), according to some embodiments. In some embodiments, the nozzle includes an inlet end having one or more inlet apertures and an outlet end having one or more outlet apertures. In some embodiments, the nozzle includes a body member that extends between the inlet end and the outlet end. In some embodiments, the nozzle includes a central member that extends centrally through the body member. In some embodiments, the nozzle includes an end member fixedly coupled with the central member at the outlet end. In some embodiments, the nozzle includes a slidable member translatably coupled with the central member. In some embodiments, the slidable member is configured to direct fluid that flows through the body member outwards towards an inner surface of the body member and translation of the slidable member adjusts a K-factor of the nozzle.

In some embodiments, the slidable member, the central member, and the end member define a fill cavity. In some embodiments, changing an amount of fluid in the fill cavity drives the slidable member to translate along the central member to adjust the K-factor of the nozzle.

In some embodiments, the fill cavity is fluidly coupled with one or more channels and/or tubular members that fluidly couple with a fluid delivery system to change the amount of fluid in the fill cavity.

In some embodiments, a longitudinally extending passageway extends through the end member and fluidly couples with the fill cavity.

In some embodiments, a laterally extending passageway extends towards a center of the nozzle and fluidly couples the longitudinally extending passageway and the fill cavity with a tubular member that extends through the central member and laterally out of the nozzle at the inlet end of the nozzle.

In some embodiments, the slidable member is configured to translate along the central member to adjust the K-factor of the nozzle using a fluid that is separate from fluid discharged at the outlet end.

In some embodiments, the slidable member is configured to translate along the central member to adjust the K-factor of the nozzle while fluid is flowing through the nozzle.

In some embodiments, the slidable member produces a restriction along a flow path of the nozzle defined between the one or more inlet apertures of the nozzle and the one or more outlet apertures of the nozzle.

In some embodiments, translation of the slidable member towards the outlet end of the nozzle increases an area of the restriction through which fluid can flow.

In some embodiments, translation of the slidable member towards the inlet end of the nozzle decreases an area of the restriction through which fluid can flow.

In some embodiments, the nozzle includes a mechanical balancing valve that regulates pressure of fluid flowing through the nozzle.

In some embodiments, the slidable member has a frustum shape and is configured to direct fluid that flows through the nozzle outwards towards the inner surface of the body member.

In some embodiments, the slidable member is configured to be driven to translate along the central member to adjust the K-factor of the nozzle by an electric solenoid.

In some embodiments, the slidable member is configured to translate towards the outlet end of the nozzle to increase the K-factor of the nozzle.

In some embodiments, the slidable member is configured to translate towards the inlet end of the nozzle to decrease the K-factor of the nozzle.

In some embodiments, the nozzle further includes a flange at the inlet end. In some embodiments, the flange is configured to fixedly couple with a corresponding flange of a tubular member that delivers fluid to the nozzle.

Another implementation of the present disclosure is a nozzle (e.g., for fire suppression), according to some embodiments. In some embodiments, the nozzle includes an inlet end having one or more inlet apertures and an outlet end having one or more outlet apertures. In some embodiments, the nozzle includes a body member that extends between the inlet end and the outlet end. In some embodiments, the nozzle includes a central member that extends centrally through the body member. In some embodiments, the nozzle includes an end member fixedly coupled with the central member at the outlet end. In some embodiments, the nozzle includes a slidable member translatably coupled with the central member. In some embodiments, the slidable member is configured to direct fluid that flows through the body member outwards towards an inner surface of the body member and translation of the slidable member adjusts a flow characteristic of the nozzle.

In some embodiments, the flow characteristic is any of a K-factor, a volumetric flow rate, and a discharge velocity.

In some embodiments, the slidable member is configured to translate along the central member to adjust the flow characteristic of the nozzle using a fluid that is separate from fluid discharged at the outlet end.

Another implementation of the present disclosure is a nozzle system, according to some embodiments. In some embodiments, the nozzle system includes a fluid supply and a nozzle fluidly coupled with the fluid supply. In some embodiments, the nozzle includes an inlet end, an outlet end, a body member, a central member, an end member, and a slidable member. In some embodiments, the inlet end includes one or more inlet apertures. In some embodiments, the outlet end includes one or more outlet apertures. In some embodiments, the body member extends between the inlet end and the outlet end. In some embodiments, the central member extends centrally through the body member. In some embodiments, the end member is fixedly coupled with the central member at the outlet end. In some embodiments, the slidable member is translatably coupled with the central member. In some embodiments, the slidable member is configured to direct fluid that flows through the body member outwards towards an inner surface of the body member. In some embodiment, translation of the slidable member adjusts a K-factor of the nozzle.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate the exemplary embodiments in detail, it should be understood that the present disclosure is not limited to the details or methodology set forth in the description or illustrated in the FIGURES. It should also be understood that the terminology used herein is for the purpose of description only and should not be regarded as limiting.

Overview

Referring generally to the FIGURES, an adjustable nozzle includes an inlet end with inlet apertures and an outlet end with an outlet aperture. A fluid flow path is defined between the inlet apertures and the outlet aperture. The nozzle includes a central member that extends longitudinally through the center of the nozzle. An end member is fixedly coupled with the central member and a slidable member is translatably coupled with the central member. The slidable member can translate along the central member to adjust a performance characteristic including a K-factor, discharge pressure, discharge rate, etc., of the nozzle. A fill cavity is defined between the central member, the slidable member and the end member. Fluid is added or removed to the fill cavity (e.g., through one or more hydraulic lines) to translate the slidable member along the central member. The slidable member produces a restriction along the flow path between the inlet aperture and the outlet aperture. Adding fluid to the fill cavity drives the slidable member to translate to a position towards the inlet end of the nozzle, thereby making the restriction more restrictive. Likewise, removing fluid from the fill cavity allows the slidable member to translate to a position towards the outlet end of the nozzle, thereby making the restriction less restrictive. In this way, the slidable member can be driven to translate along the central member, thereby adjusting the K-factor or other performance characteristics (e.g., pressure, flow rate, discharge velocity, mass flow rate, volumetric flow rate, etc.) of the nozzle.

System

Figure 1:
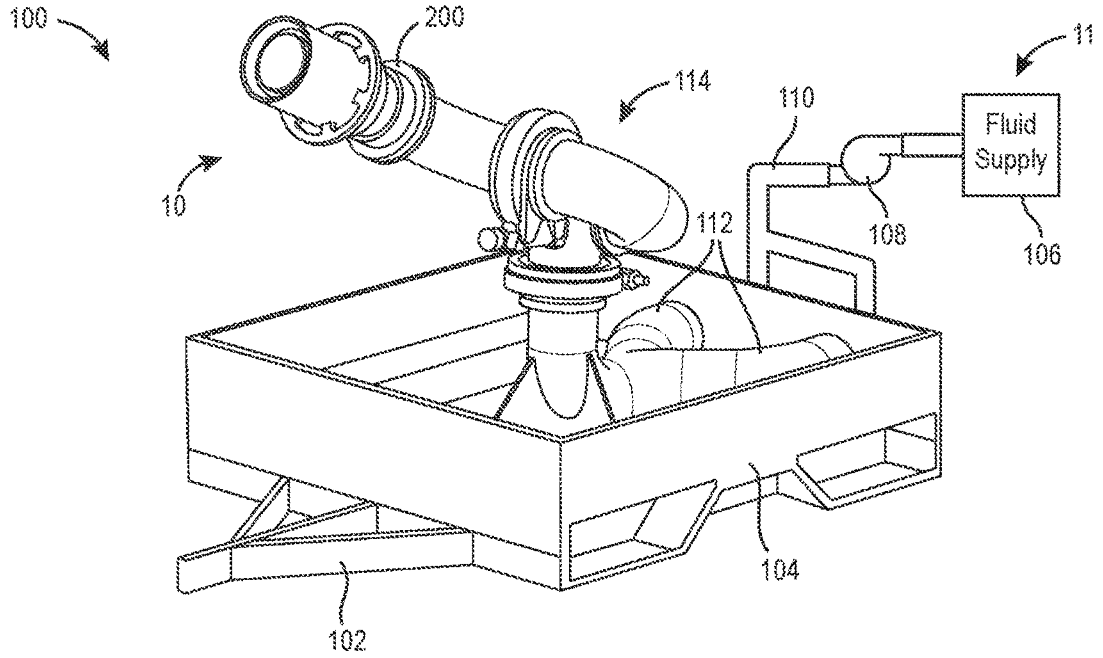
FIG. 1 is a perspective view of a jet nozzle system, according to some embodiments.
Figure 2:
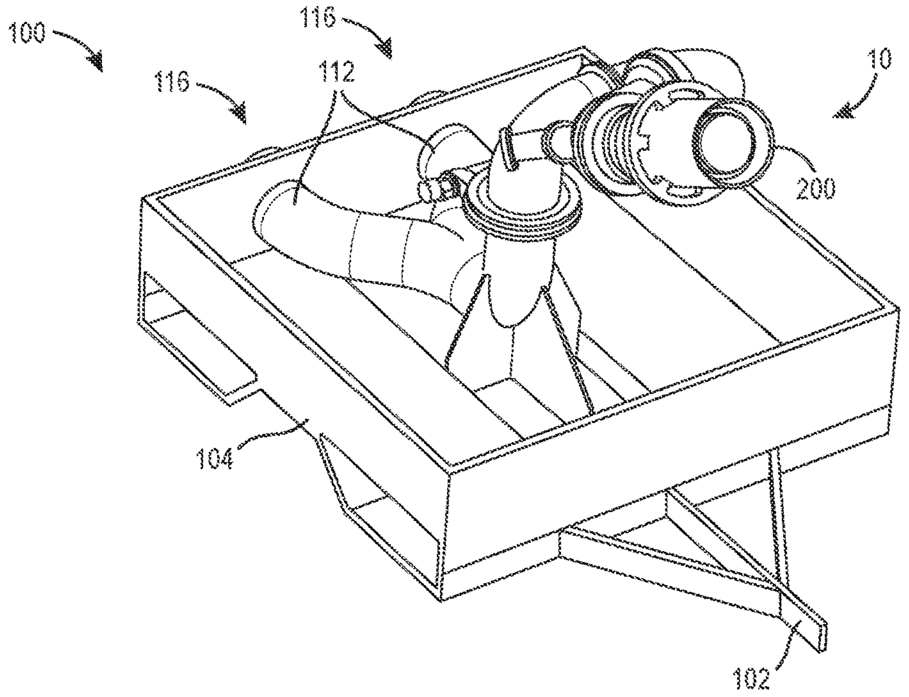
FIG. 2 is a perspective view of the jet nozzle system of FIG. 1, according to some embodiments.

Referring particularly to FIGS. 1-2, a jet nozzle system, a fire suppression system, etc., shown as nozzle system 100 includes a nozzle assembly 10 and a fluid delivery system 11, according to an exemplary embodiment. Nozzle assembly 10 includes a fog jet, a fog jet nozzle, a jet nozzle, a high powered nozzle, etc., shown as nozzle 200 and a piping system 114. Fluid delivery system 11 is configured to provide nozzle system 100 with liquid (e.g., water), fluid, or fire suppressant agent. The liquid is provided to nozzle system 100 by fluid delivery system 11 and sprayed, emitted, ejected, directed, etc., by nozzle 200 for fire suppression purposes. For example, nozzle 200 can be used for pre or post fire activities, de-watering, cooling operations/applications, vapor mitigation, vapor suppression, etc. All such applications of nozzle 200 should be understood to be within the scope of the present disclosure. Additionally, the term "fire suppression" as used herein should be understood to refer to any pre or post fire activities, de-watering activities, cooling operations/applications/activities, vapor mitigation, vapor suppression, etc. Nozzle 200 can be generally referred to as a fire service nozzle, or a nozzle configured to perform various activities related to fire prevention, suppression, mitigation, etc.

Fluid delivery system 11 includes a fluid supply reservoir, a tank, etc., shown as fluid supply 106. In some embodiments, fluid supply 106 is a tank. In other embodiments, fluid supply 106 is a lake, a river, an ocean, etc., or any other supply of water or liquid that can be used by nozzle system 100 for fire suppression. In some embodiments, fluid supply 106 is a municipal water supply. Fluid supply 106 can be any reservoir, container, tank, etc., that is capable of providing sufficient volumes of fluid to nozzle system 100 for fire suppression purposes. In some embodiments, fluid supply 106 is elevated a distance above nozzle system 100 (e.g., in a water tower) such that the fluid or liquid provided to nozzle system 100 has head pressure.

Fluid delivery system 11 can include a pump 108, and one or more conduits, hoses, pipes, tubular members, pipes, etc., shown as tubing 110. Tubing 110 can fluidly couple pump 108 with fluid supply 106 and nozzle assembly 10. In some embodiments, tubing 110 includes multiple tubes that directly fluidly couple with corresponding tubular members or pipes 112 of nozzle system 100. Pump 108 pressurizes the fluid such that the fluid is forced to enter pipes 112 of nozzle system 100 (e.g., at a speed $v_{fluid}$ or at a volumetric flow rate $\dot{V}_{fluid}$) through inlets 116. For example, the volumetric flow rate of fluid or liquid that is provided to and/or discharged by nozzle 200 can be 1600 gallons per minute. In some embodiments, the flow rate of fluid or fire suppressant agent that exits or is discharged from nozzle 200 is referred to as the discharge flow rate $\dot{V}_{discharge}$. In some embodiments, the discharge flow rate $\dot{V}_{discharge}$ is adjustable independently of pressure of fluid/liquid provided to nozzle 200. In some embodiments, the discharge flow rate $\dot{V}_{discharge}$ of the fire suppressant agent or fluid that exits nozzle 200 is 1600 gallons per minute. In some embodiments, the discharge flow rate $\dot{V}_{discharge}$ of fluid or fire suppressant agent that exits nozzle 200 is greater than 1600 gallons per minute or less than 1600 gallons per minute.

In some embodiments, the fluid or liquid that nozzle 200 uses for fire suppression (e.g., to discharge onto a fire) is provided to nozzle 200 through piping system 114. Piping system 114 can include various joints, bends, (e.g., elbow connectors, T connectors, etc.) that facilitate the transfer of fluid or fire suppressant agent from fluid delivery system 11 to nozzle 200. Piping system 114 includes various tubular members, conduits, pipes, tubes, etc., that include an inner volume for the fire suppressant agent/fluid to travel through. In some embodiments, an inner volume of the various tubular members of piping system 114 is fluidly coupled with an inner volume of pipes 112 to fluidly couple piping system 114 and nozzle 200 with fluid supply 106.

Nozzle assembly 10 (e.g., piping system 114, nozzle 200, etc.) can be coupled (e.g., mounted, fixedly coupled, pivotally coupled, etc.) to a frame, a carriage, a truck, a trailer, a platform, etc., shown as frame 104. In some embodiments, frame 104 is coupled with a vehicle (e.g., a truck, a fire truck, a wheeled vehicle, a vehicle with tractive elements, a vehicle with treads, etc.). In some embodiments, frame 104 is a trailer that can be towed behind a vehicle. Frame 104 can include a connecting portion, an interfacing portion, an attachment member, a tow hitch, etc., shown as attachment member 102. In some embodiments, attachment member 102 is configured to removably couple with a rear end of a vehicle (e.g., at a spindle hitch at the rear of the vehicle). Advantageously, this facilitates transporting nozzle assembly 10 to a site where a fire is located. In some embodiments, nozzle assembly 10 is towed or pulled behind a vehicle, and upon reaching a fire site, is fluidly coupled (e.g., connected) with fluid delivery system 11. In some embodiments, fluid delivery system 11 is also fixedly coupled with frame 104 such that fluid delivery system 11 is towable or transportable to the site where the fire is located.

Nozzle assembly 10 can be transported to a fire site or an emergency site and used to suppress a fire at or near the emergency site. In some embodiments, one or more of the tubular members of piping system 114 are pivotally or rotatably coupled with each other such that a discharge direction of nozzle 200 can be adjusted (e.g., automatically with motors, or manually by fire suppression personnel). The fire suppressant agent is discharge through nozzle 200 and sprayed onto the fire. The fire can be located a distance away from a location of nozzle 200. Advantageously, the discharge direction, and discharge flow rate $\dot{V}_{discharge}$ of nozzle 200 can be adjusted to facilitate targeting and suppressing the fire.

Figure 3:
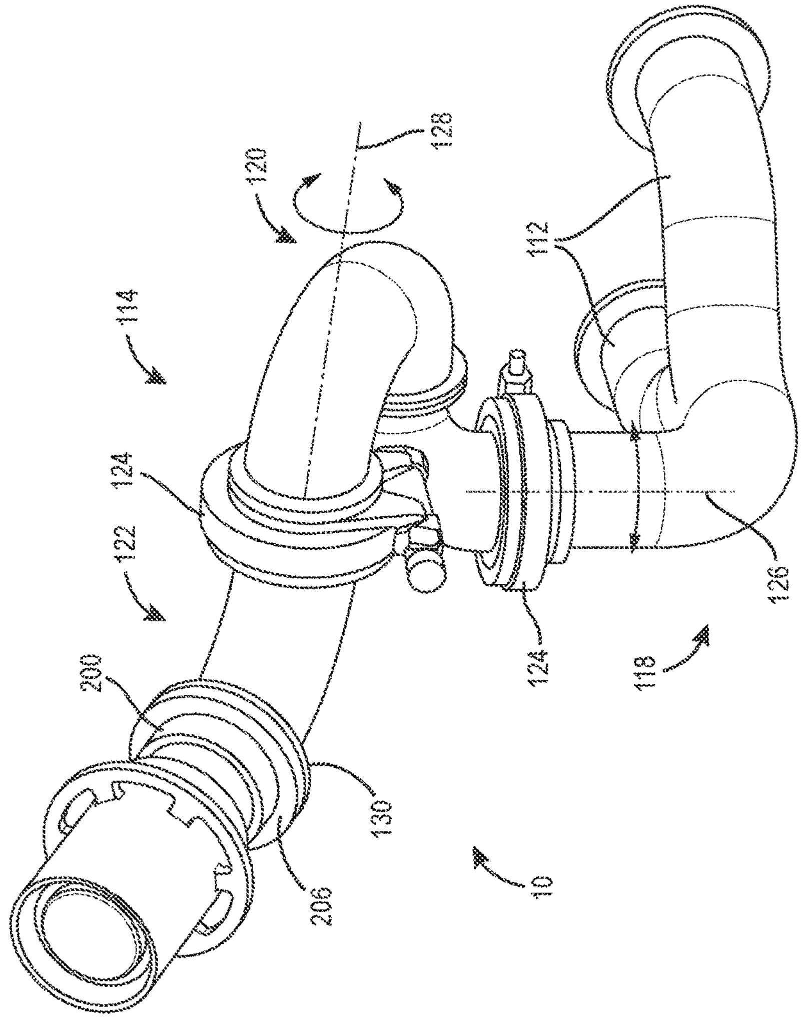
FIG. 3 is a perspective view of a nozzle assembly of the jet nozzle system of FIG. 1, according to some embodiments.
Figure 4:
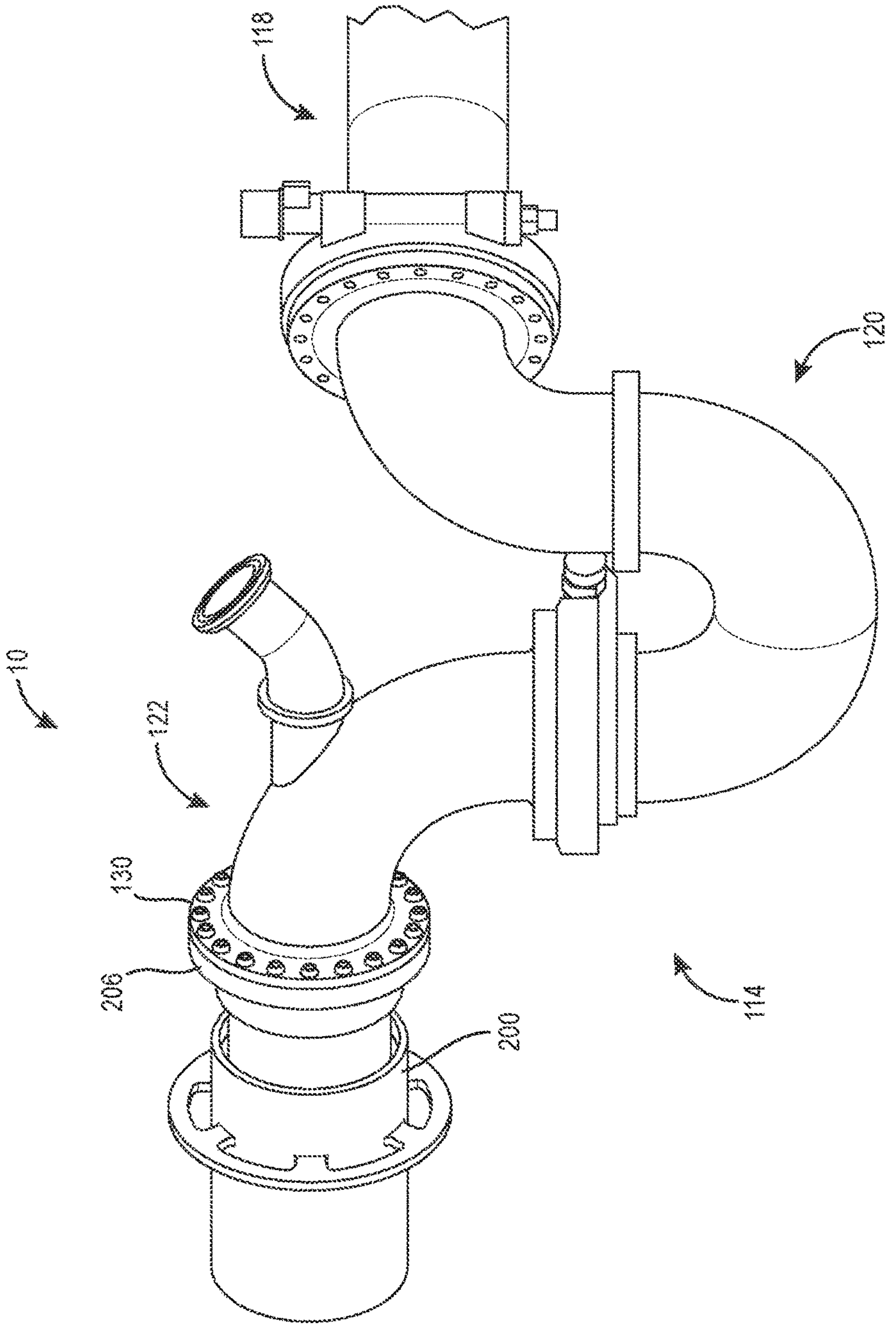
FIG. 4 is a perspective view of the nozzle assembly of FIG. 3, according to some embodiments.

Referring particularly to FIGS. 3-4, nozzle assembly 10 is shown in greater detail, according to some embodiments. In some embodiments, piping system 114 includes a base portion of tubular members 118, a medial portion of tubular members 120, and an upper portion of tubular members 122. In some embodiments, tubular members 118 are coupled (e.g., fixedly coupled) with frame 104. Tubular members 118 can include pipes 112 that receive the water or fire suppressant agent from fluid delivery system 11. Tubular members 120 (e.g., the medial portion of piping system 114) is pivotally or rotatably coupled with tubular members 118 through a rotatable coupling 124. In some embodiments, rotatable coupling 124 facilitates rotation or pivoting of tubular members 120 and tubular members 122 about axis 126 relative to tubular members 118. In some embodiments, tubular members 120 and tubular members 122 are rotatable about axis 126 relative to tubular members 118 to facilitate changing the discharge direction of nozzle 200. Axis 126 extends through a center of the rotatable coupling 124 that couples tubular members 118 with tubular members 120. In some embodiments, axis 126 is a substantially vertical axis such that tubular members 120 and tubular members 122 are rotatable relative to tubular members 118 a full 360 degrees. This facilitates reaching or targeting fire regardless of their angular position relative to nozzle assembly 10.

Tubular members 122 are rotatably or pivotally coupled with tubular members 120 through another rotatable coupling 124 to facilitate rotation or pivoting of tubular members 122 about axis 128 relative to tubular members 120. In some embodiments, rotation of tubular members 122 and nozzle 200 about axis 128 facilitates increasing or decreasing a vertical discharge angle of nozzle 200 (e.g., to discharge the water, fluid, fire suppressant agent, etc., in a higher or lower direction relative to a ground surface to reach fires that are further away). Nozzle 200 is fluidly and fixedly coupled with tubular members 122, which are fluidly and pivotally coupled with tubular members 120, which are fluidly and pivotally/rotatably coupled with tubular members 118. Advantageously, rotatable couplings 124 facilitate adjustment of the discharge direction of nozzle 200 in multiple directions (e.g., a horizontal and vertical direction). In some embodiments, tubular members 118 are fluidly coupled with pipes 112. In this way, fluid that is provided to pipes 112 by fluid delivery system 11 is transferred through tubular members 118, 120, and 122, to nozzle 200 where it can be discharged onto a fire for fire suppression.

Nozzle 200 includes a flange, an annular protrusion, an interfacing member, a coupling member, etc., shown as flange 206. Flange 206 is configured to fixedly couple (e.g., mate) with a corresponding flange 130 of tubular members 122. In some embodiments, flange 130 of tubular members 122 includes a surface that is configured to contact and seal with a corresponding surface of flange 206 to fluidly couple nozzle 200 with tubular members 122. In some embodiments, flange 130 is positioned at an end of an outer portion of tubular members 122. Flange 130 and flange 206 are configured to seal to fluidly couple a receiving aperture or an inner volume of nozzle 200 with piping system 114.

Nozzle

Figure 5:
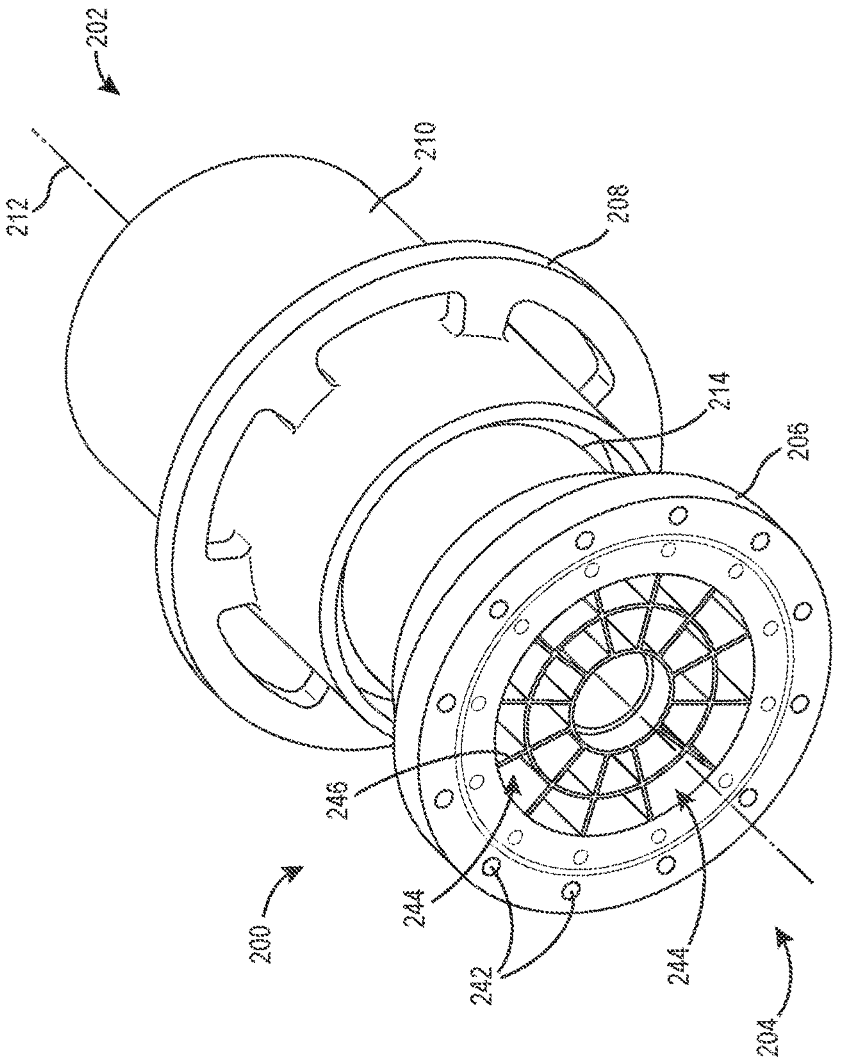
FIG. 5 is a perspective view of a nozzle of the jet nozzle system of FIG. 1, according to some embodiments.
Figure 6:
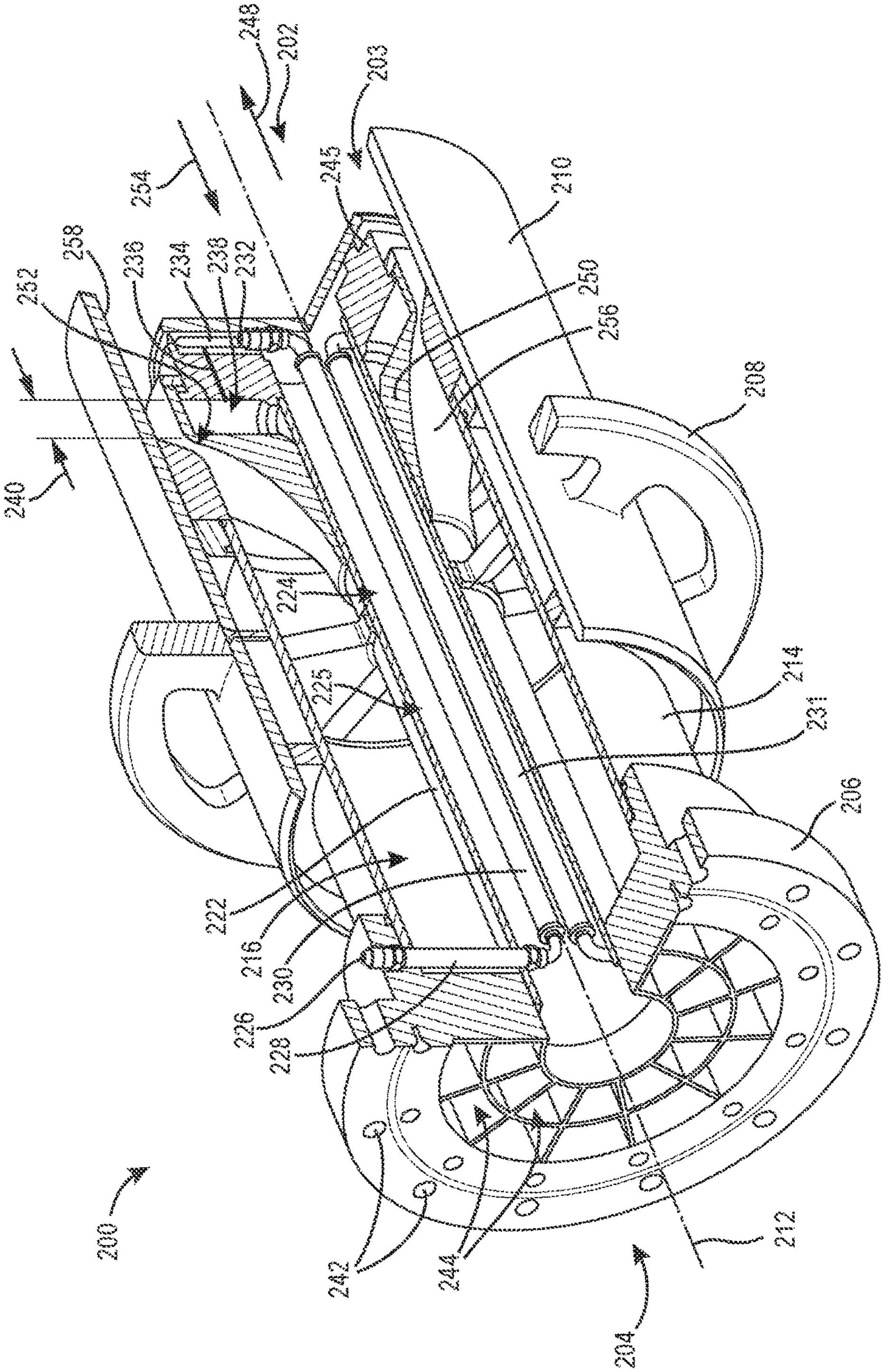
FIG. 6 is a perspective sectional view of the nozzle of the jet nozzle system of FIG. 1, according to some embodiments.
Figure 7:
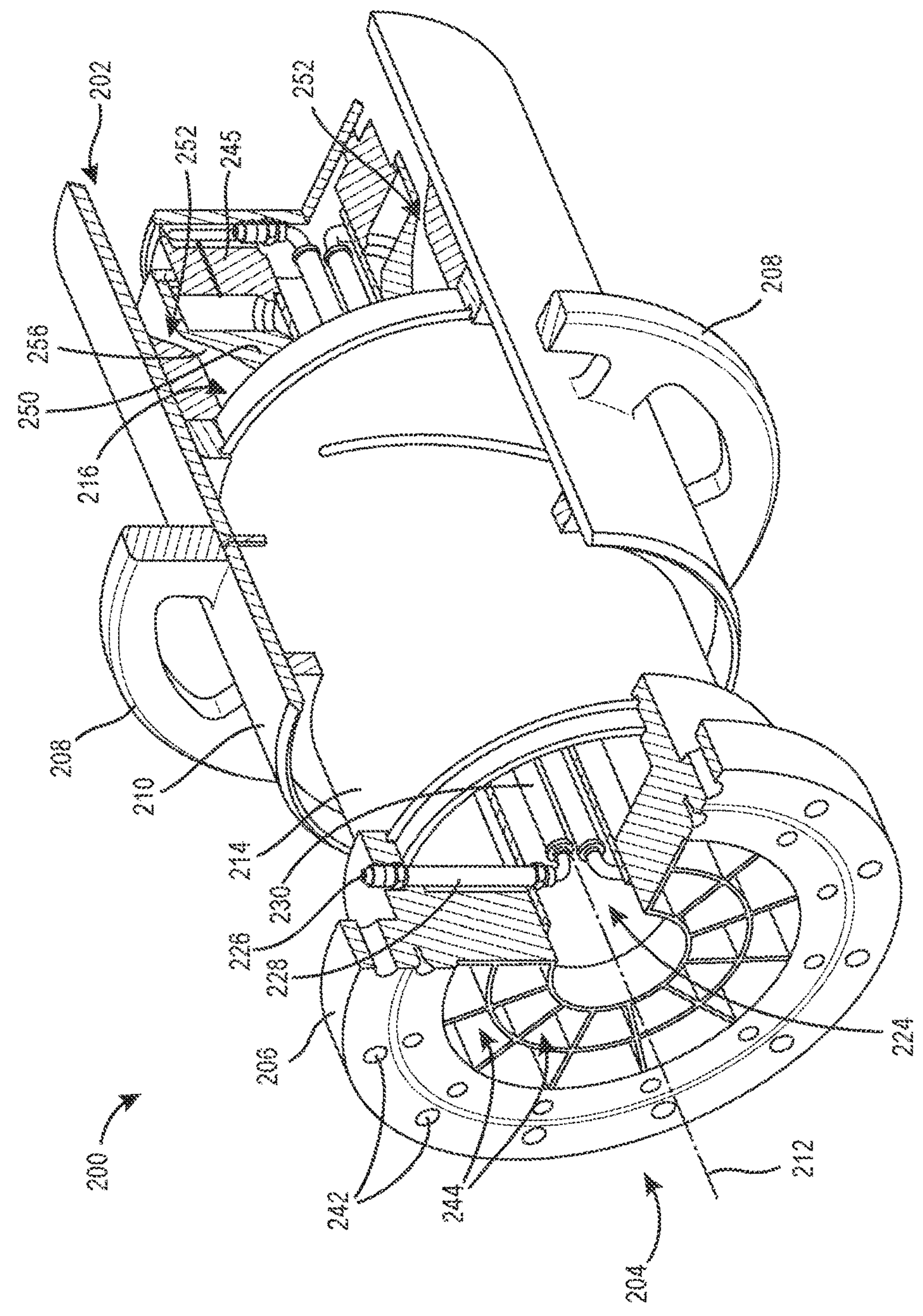
FIG. 7 is a perspective sectional view of the nozzle of the jet nozzle system of FIG. 1, according to some embodiments.

Referring particularly to FIGS. 5-7, nozzle 200 is shown in greater detail, according to some embodiments. In some embodiments, nozzle 200 has a K-factor that can be adjusted independently of water or fluid that passes through nozzle 200.

The K-factor can be defined as $$K = \frac{\dot{V}_{discharge}}{\sqrt{p}},$$

where K is the K-factor, $\dot{V}_{discharge}$ is the discharge flow rate, and p is the pressure at nozzle 200. Nozzle 200 includes an inlet end 204 and an outlet end 202. A longitudinal axis 212 extends through a center of nozzle 200 in a longitudinal direction. Nozzle 200 is configured to receive fire suppressant agent at inlet end 204 and discharge or emit the fire suppressant agent through outlet end 202, according to some embodiments.

Flange 206 is positioned at inlet end 204 of nozzle 200 and is configured to fluidly couple nozzle 200 with piping system 114 for fire suppression purposes, according to some embodiments. In some embodiments, flange 206 is fixedly coupled with a first body member 214. First body member 214 can have a cylindrical shape that includes sidewalls that define an inner volume through which the fire suppressant agent passes. Flange 206 includes multiple connection portions or apertures 242 that are circumferentially patterned along flange 206 and extend at least partially through flange 206. In some embodiments, apertures 242 are evenly and angularly spaced apart along substantially an entire circumference of flange 206. Apertures 242 are configured to align with corresponding apertures or coupling portions of flange 130 to facilitate removable coupling between nozzle 200 and tubular members 122. In some embodiments, apertures 242 of flange 206 and the corresponding apertures of flange 130 are configured to receive fasteners (e.g., bolts, screws, etc.) therethrough to couple flange 130 and flange 206.

In some embodiments, inlet end 204 of nozzle 200 includes one or more inlet apertures 244 that are configured to receive fire suppressant agent or fluid therethrough. In some embodiments, inlet apertures 244 are defined between adjacent or neighboring thin walls, thin members, etc., shown as thin wall members 246. In some embodiments, thin wall members 246 have a honey-comb configuration and define apertures 244 therebetween for receiving the fire suppressant agent.

Inlet apertures 244 fluidly couple with an inner volume, an inner chamber, a cavity, a space, etc., within first body member 214 of nozzle 200, shown as inner volume 216. In some embodiments, inner volume 216 extends through substantially an entire longitudinal length of nozzle 200. Inner volume 216 receives and facilitates the flow of fire suppressant agent through nozzle 200 for fire suppression purposes. In some embodiments, inner volume 216 is fluidly coupled with an outlet aperture 203 at outlet end 202. In some embodiments, a fluid flow path is defined between inlet apertures 244, inner volume 216 and outlet aperture 203.

First body member 214 can be received within and couple with a second body member 210. In some embodiments, second body member 210 has a same shape as first body member 214 with a larger cross sectional area that first body member 214 is received within. In some embodiments, an inner volume 216 extends through first body member 214 and second body member 210 to transport the fire suppressant agent (e.g., the water or fluid) from inlet end 204 of nozzle 200 to outlet end 202 of nozzle 200.

In some embodiments, second body member 210 is an outer body member that includes a handle, an annular handle, a ring, etc., shown as handle 208. Handle 208 facilitates grasping and directing of nozzle 200. Handle 208 can be fixedly coupled with second body member 210 and may extend circumferentially around second body member 210.

Nozzle 200 includes a central member, a central tubular member, a central body member, a central housing member, etc., shown as central member 222. In some embodiments, central member 222 extends along longitudinal axis 212 of nozzle 200. Central member 222 can include an inner volume 224 for protecting and enclosing one or more hoses, hydraulic lines, tubular members, etc., shown as hydraulic lines 225. In some embodiments, fire suppressant agent (e.g., water or a liquid) does not enter inner volume 224 of central member 222. In this way, central member 222 can protect any components within inner volume 224 from the high pressure fire suppressant agent.

Central member 222 includes a slidable member, an adjustable member, a guide member, a baffle, etc., shown as slidable member 250. Slidable member 250 can include an inner volume, an engagement surface, an aperture, etc., that extends through a center of slidable member 250 and is configured to engage and slidably couple with an outer surface or periphery of central member 222. Slidable member 250 can have the shape of a frustum or a frustoconical shape and directs the fluid outwards towards inner surface 258 of second body member 210. Slidable member 250 includes a contact surface 256 that is configured to contact and guide the fire suppressant agent that flows through inner volume 216 outwards towards inner surface 258 of second body member 210. In some embodiments, contact surface 256 lies along the fluid flow path defined by inlet apertures 244, inner volume 216, and outlet aperture 203. Contact surface 256 guides or directs the fire suppressant agent outwards so that the fire suppressant agent flows or passes through a restriction 252. In some embodiments, restriction 252 is defined between inner surface 258 of second body member 210 and slidable member 250. Restriction 252 can be selectably increased in size (e.g., to make restriction 252 less restrictive) or decreased in size (e.g., to make restriction 252 more restrictive) through movement (e.g., translation) of slidable member 250 to adjust a K-factor of nozzle 200. In some embodiments, slidable member 250 is configured to translate along central member 222 in direction 248 to make restriction 252 less restrictive (e.g., to increase the size of restriction 252). Likewise, slidable member 250 can be configured to translate along central member 222 in direction 254 to make restriction 252 more restrictive (e.g., to decrease the size of restriction 252). In some embodiments, translation of slidable member 250 towards outlet end 202 (e.g., in direction 248) increases the K-factor of nozzle 200 and increases an area of restriction 252 through which fluid can flow. In some embodiments, translation of slidable member 250 towards inlet end 204 (e.g., in direction 254) decreases the K-factor of nozzle 200 and decreases an area of restriction 252 through which fluid can flow.

Slidable member 250 can be selectably translated along central member 222 in either direction to increase or decrease the restrictiveness of restriction 252. Nozzle 200 includes an end member, a fixed member, etc., shown as end member 245. End member 245 can be fixedly coupled with central member 222. In some embodiments, end member 245 is positioned at a distal or outlet end of central member 222. Slidable member 250 and end member 245 define an inner volume, a chamber, a cavity, etc., therebetween, shown as fill cavity 238. Fill cavity 238 can be defined by surfaces of central member 222, end member 245, and slidable member 250. Fill cavity 238 can be filled with a fluid so that the pressure exerted on slidable member 250 by the fire suppressant agent that flows through nozzle 200 does not translate slidable member 250 into direct contact with end member 245 and so that the volume of fill cavity 238 is maintained (e.g., to maintain a longitudinal length 240 of fill cavity 238).

Nozzle 200 includes hydraulic lines, pneumatic lines, water lines, conduits, tubular members, pipes, hoses, etc., shown as hydraulic line 230 and a hydraulic line 231 that extend longitudinally through inner volume 224 of central member 222. Hydraulic line 230 is fluidly coupled with a lateral hydraulic line 228 that extends through inner volume 216 of nozzle 200 and has a coupling 226 that protrudes out of nozzle 200. Hydraulic line 230 is fluidly coupled with lateral hydraulic line 228 at a first or proximate end of nozzle 200. Hydraulic line 230 is fluidly coupled with a channel, a flow conduit, a flow path, an orifice, a passage, a passageway, etc., shown as lateral passageway 234. Lateral passageway 234 is formed within end member 245 and extends outwards from an inner surface of end member 245. Lateral passageway 234 fluidly couples with a passageway, a passage, a channel, a flow conduit, etc., shown as longitudinal passageway 236. Longitudinal passageway 236 fluidly couples with fill cavity 238. Fluid can be provided to fill cavity 238 through longitudinal passageway 236, lateral passageway 234, hydraulic line 230, and lateral hydraulic line 228. Hydraulic line 230 may fluidly and sealingly couple with lateral passageway through a connector 232 that is received at least partially within lateral passageway 234.

Hydraulic line 230 is fluidly coupled to and operable to add or remove fluid from fill cavity 238 to translate slidable member 250 along central member 222 and adjust the K-factor of nozzle 200. In some embodiments, hydraulic line 231 is configured to provide an additive to fluid or liquid that passes through nozzle 200. For example, hydraulic line 231 can fluidly couple with an additive system and provide the additive into the flow path of fluid that passes through nozzle 200.

Fluid can be added or removed to fill cavity 238 through longitudinal passageway 236, lateral passageway 234, hydraulic line 230, and lateral hydraulic line 228. For example, a hose or a tubular member that fluidly couples with a fluid reservoir can connect with lateral hydraulic line 228 through coupling 226. As fill cavity 238 is filled with fluid, a volume of fill cavity 238 increases and slidable member 250 translates along central member 222 in direction 254. As fill cavity 238 is filled with fluid, longitudinal length 240 of fill cavity 238 may increase. Likewise, as fluid (e.g., liquid) is removed from fill cavity 238, the volume of fill cavity 238 decreases, slidable member 250 translates in direction 248, and longitudinal length 240 of fill cavity 238 decreases.

Liquid can be selectably added or removed from fill cavity 238 to translate slidable member 250 along central member 222 of nozzle 200. In some embodiments, fluid can be added or removed to fill cavity 238 by a fluid system that connects with coupler 226. The fluid system can include a pump, a controller that operates the pump, a fluid reservoir, and one or more tubular members that fluidly couple with hydraulic line 230. The pump can operate to transfer fluid between the fluid reservoir and fill cavity 238 to translate slidable member 250 along central member 222 and adjust the K-factor of nozzle 200.

In other embodiments, a linear electric actuator is used to translate slidable member 250 along central member 222 to adjust the K-factor of nozzle 200. The linear electric actuator can be configured to exert translational force on slidable member 250 relative to central member 222 to translate slidable member 250.

Advantageously, nozzle 200 has a K-factor that is adjustable independently of the fire suppressant agent. For example, the K-factor of nozzle 200 can be adjusted by translating slidable member 250 along central member 222 (e.g., by adding or removing fluid from fill cavity 238) independently of the fire suppressant agent that flows through nozzle 200. This provides an additional point of controllability for an operator of nozzle 200. The systems and methods (e.g., the fluid delivery system) for adding or removing fluid to fill cavity 238 to adjust the K-factor of nozzle 200 can be operated and controlled by an operator to achieve a desired K-factor of nozzle 200.

In some embodiments, slidable member 250 can be manually operated to translate along central member 222 to achieve a desired K-factor. Slidable member 250 can be manually controlled using a lever or an electric solenoid (e.g., for remote nozzles 200). This allows the user to manually set the position of slidable member 250 which changes the K-factor of nozzle 200. This adjustment can be made while water or fire suppressant fluid is flowing through nozzle 200.

In some embodiments, slidable member 250 uses a mechanical balancing valve to achieve an automatic translation of slidable member 250 along central member 222. This allows nozzle 200 to automatically regulate pressure or K-factor to a specific set point which can be adjusted by an operator of nozzle 200 while water or fire suppressant fluid is flowing through nozzle 200.

In some embodiments, the K-factor of nozzle 200 can be automatically/manually adjusted using a programmable logic controller or microprocessor and electric solenoids. For example, slidable member 250 can be driven to translate along central member 222 by an electric solenoid which is operated by a controller. This facilitates the user interfacing with and controlling nozzle 200 in a manual or automatic fashion by way of a human machine interface (HMI). The HMI can be a fixed hardware (e.g., a user interface with buttons, levers, knobs, screens, etc.) or a mobile application that runs on a personal computing device and wirelessly (or wiredly) communicates with the controller.

Advantageously, nozzle 200 facilitates allowing the user to change the pressure of nozzle 200 or the K-factor of nozzle 200 without shutting down water flow through nozzle 200 and disassembling the nozzle. Nozzle 200 also provides manual control over slidable member 250 for cases where an operator's judgment is needed.

It should be understood that other energy sources can be used to control the baffle head (i.e., slidable member 250). Slidable member 250 can be translated along central member 222 by internal water pressure in fill cavity 238 as shown in FIGS. 5-7. However, it is contemplated that slidable member 250 can be controlled (e.g., operated to translate along central member 222) via other energy sources such as electrically, pneumatically, with water, or hydraulically.

Control System

Figure 8:
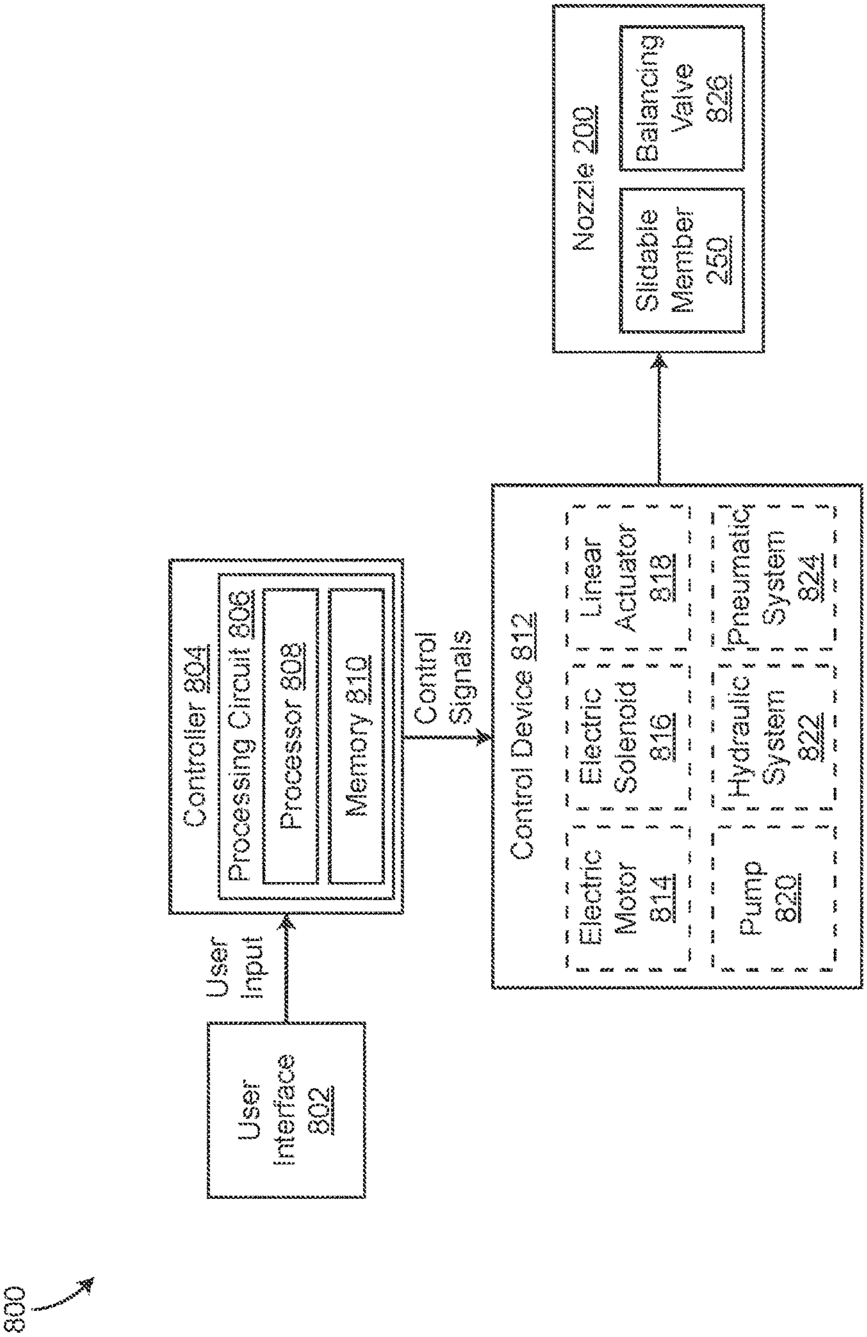
FIG. 8 is a block diagram of a control system for adjusting the nozzle of FIGS. 1-7, according to some embodiments.

Referring now to FIG. 8, a control system 800 (e.g., a fire suppression system) for adjusting flow characteristics (e.g., the K-factor, discharge mass flow rate, discharge pressure, discharge velocity, discharge volumetric flow rate, etc.) is shown, according to some embodiments. Control system 800 includes a human machine interface or a user interface 802, a controller 804, a control device 812, and nozzle 200, according to some embodiments.

User interface 802 can be any human machine interface, input device, personal computer device, etc., that can receive a user input. In some embodiments, user interface 802 includes any of or a combination of a touch screen, one or more buttons, one or more levers, one or more switches, dials, etc. that are configured to receive a user input from an operator of nozzle 200. User interface 802 is communicably connected with controller 804 and is configured to provide the user input to controller 804, according to one embodiment. In other embodiments, user interface 802 is directly communicably connected with control device 812 and is configured to provide the user input directly to control device 812. For example, user interface 802 can be a human machine interface of any of control devices 812. In other embodiments, user interface 802 is a smartphone that wirelessly communicates with controller 804 and/or control device 812. In some embodiments, user interface 802 is wiredly communicably connected with controller 804 and/or control device 812. In some embodiments, user interface 802 and controller 804 each include a wireless transceiver and are configured to communicate wirelessly using a variety of wireless communications protocols (e.g., LoRa, Bluetooth, Zigbee, Wi-Fi, near field communications (NFC), etc.).

Controller 804 can include a communications interface. The communications interface may facilitate communications between controller 804 and external systems, devices, sensors, etc. (e.g., user interface 802, control devices 812, etc.) for allowing user control, monitoring, and adjustment to any of the communicably connected devices, sensors, systems, primary movers, etc. The communications interface may also facilitate communications between controller 804 and a human machine interface. The communications interface may facilitate communications between controller 804 and user interface 802, control device 812, etc.

The communications interface can be or include wired or wireless communications interfaces (e.g., jacks, antennas, transmitters, receivers, transceivers, wire terminals, etc.) for conducting data communications with sensors, devices, systems, etc., of control system 800 or other external systems or devices. In various embodiments, communications via the communications interface can be direct (e.g., local wired or wireless communications) or via a communications network (e.g., a WAN, the Internet, a cellular network, etc.). For example, the communications interface can include an Ethernet card and port for sending and receiving data via an Ethernet-based communications link or network. In another example, the communications interface can include a Wi-Fi transceiver for communicating via a wireless communications network. In some embodiments, the communications interface is or includes a power line communications interface. In other embodiments, the communications interface is or includes an Ethernet interface, a USB interface, a serial communications interface, a parallel communications interface, etc.

Controller 804 includes a processing circuit 806, processor 808, and memory 810, according to some embodiments. Processing circuit 808 can be communicably connected to the communications interface such that processing circuit 806 and the various components thereof can send and receive data via the communications interface. Processor 808 can be implemented as a general purpose processor, an application specific integrated circuit (ASIC), one or more field programmable gate arrays (FPGAs), a group of processing components, or other suitable electronic processing components.

Memory 810 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 810 can be or include volatile memory or non-volatile memory. Memory 810 can include database components, object code components, script components, or any other type of information structure for supporting the various activities and information structures described in the present application. According to some embodiments, memory 810 is communicably connected to processor 808 via processing circuit 806 and includes computer code for executing (e.g., by processing circuit 806 and/or processor 808) one or more processes described herein.

Controller 804 is configured to receive the user input from user interface 802 and output control signals to control device 812 to operate or adjust nozzle 200. In some embodiments, controller 804 generates the control signals and provides the control signals to control device 812 to translate slidable member 250.

Control device 812 can be or include any device or primary mover configured to drive slidable member 250 to translate and thereby adjust flow characteristics of nozzle 200. In some embodiments, control device 812 is or includes an electric motor 814, an electric solenoid 816, a linear electric actuator 818, a pump 820, a hydraulic system 822, a pneumatic system 824, etc. In some embodiments, control device 812 directly operates slidable member 250 to translate (e.g., a linear electric actuator directly engages and moves slidable member 250) to adjust the flow characteristics of nozzle 200. In other embodiments, control device 812 operates to add or remove fluid from fill cavity 238 to drive slidable member 250 to translate and thereby adjust the flow characteristics of nozzle 200. In some embodiments, control device 812 also operates a mechanical balancing valve 826 to automatically regulate pressure or K-factor to a specific adjustable set point.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire suppression system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

What is claimed is:

1. A nozzle comprising:

an inlet end comprising one or more inlet apertures;

an outlet end comprising one or more outlet apertures;

a body member that extends between the inlet end and the outlet end;

a central member that extends centrally through the body member;

a tubular member that extends through the central member;

an end member fixedly coupled with the central member at the outlet end; and a slidable member translatably coupled with the central member, a chamber being defined between the slidable member and the end member, wherein a first flow path extends from the one or more inlet apertures to the one or more outlet apertures and is at least partially defined by the body member and the slidable member, wherein the slidable member is configured to direct a first fluid that flows along the first flow path outwards towards an inner surface of the body member, wherein a second flow path extends through the tubular member that extends through the central member, wherein the tubular member that extends through the central member is configured to direct a second fluid to the chamber, and wherein the first flow path is fluidly decoupled from the second flow path and the chamber; and wherein translation of the slidable member adjusts a K-factor of the nozzle.

2. The nozzle of claim 1, wherein the chamber is a fill cavity defined between the slidable member, the central member, and the end member, wherein changing an amount of the second fluid in the fill cavity drives the slidable member to translate along the central member to adjust the K-factor of the nozzle.

3. The nozzle of claim 2, wherein the tubular member is a first tubular member, wherein the second flow path is defined by at least one of a channel or a second tubular member that fluidly couples with a fluid delivery system to change the amount of the second fluid in the fill cavity.

4. The nozzle of claim 3, wherein the second flow path includes a longitudinally extending passageway that extends through the end member and fluidly couples with the fill cavity.

5. The nozzle of claim 4, wherein the second flow path includes a laterally extending passageway that extends towards a center of the nozzle and fluidly couples the longitudinally extending passageway and the fill cavity with the tubular member that extends through the central member and laterally out of the nozzle at the inlet end of the nozzle.

6. The nozzle of claim 1, wherein the slidable member is configured to translate along the central member to adjust the K-factor of the nozzle while the fluid is flowing through the nozzle.

7. The nozzle of claim 1, wherein the slidable member produces a restriction along the flow path.

8. The nozzle of claim 7, wherein translation of the slidable member towards the outlet end of the nozzle increases an area of the restriction through which the fluid can flow.

9. The nozzle of claim 7, wherein translation of the slidable member towards the inlet end of the nozzle decreases an area of the restriction through which the fluid can flow.

10. The nozzle of claim 1, wherein the nozzle comprises a mechanical balancing valve that regulates pressure of the fluid flowing through the nozzle.

11. The nozzle of claim 1, wherein the slidable member has a frustum shape and is configured to direct the fluid that flows through the nozzle outwards towards the inner surface of the body member.

12. The nozzle of claim 1, wherein the slidable member is configured to be driven to translate along the central member to adjust the K-factor of the nozzle by an electric solenoid.

13. The nozzle of claim 1, wherein the slidable member is configured to translate towards the outlet end of the nozzle to increase the K-factor of the nozzle.

14. The nozzle of claim 1, wherein the slidable member is configured to translate towards the inlet end of the nozzle to decrease the K-factor of the nozzle.

15. The nozzle of claim 1, further comprising a flange at the inlet end, wherein the flange is configured to fixedly couple with a corresponding flange of a tubular member that delivers the fluid to the nozzle.

16. A nozzle comprising:

an inlet end comprising one or more inlet apertures;

an outlet end comprising one or more outlet apertures;

a body member that extends between the inlet end and the outlet end;

a central member that extends centrally through the body member, wherein a first flow path for a first fluid is defined between an outer surface of the central member and an inner surface of the body member;

a tubular member that extends through the central member;

an end member fixedly coupled with the central member at the outlet end; and a slidable member translatably coupled with the central member, a fill cavity being defined between the slidable member and the end member, wherein the slidable member is configured to direct the first fluid that flows along the first flow path outwards towards the inner surface of the body member, wherein a second flow path for a second fluid extends through the tubular member to the fill cavity, and wherein the slidable member is repositionable independent of a flow of the first fluid along the first flow path; and wherein translation of the slidable member adjusts a flow characteristic of the nozzle.

17. The nozzle of claim 16, wherein the flow characteristic is any of a K-factor, a volumetric flow rate, or a discharge velocity.

18. The nozzle of claim 16, wherein the slidable member is configured to translate along the central member to adjust the flow characteristic of the nozzle using a fluid that is separate from fluid discharged at the outlet end.

19. A nozzle system comprising:

a fluid supply configured to supply a fluid; and a nozzle fluidly coupled with the fluid supply, the nozzle comprising:

an inlet end comprising one or more inlet apertures;

an outlet end comprising one or more outlet apertures;

a body member that extends between the inlet end and the outlet end;

a central member that extends centrally through the body member;

a tubular member that extends through the central member;

an end member fixedly coupled with the central member at the outlet end; and a slidable member translatably coupled with the central member, a chamber being defined between the slidable member and the end member, wherein a first flow path extends from the one or more inlet apertures to the one or more outlet apertures and is at least partially defined by the body member and the slidable member, wherein the slidable member is configured to direct a first fluid that flows along the first flow path outwards towards an inner surface of the body member, wherein a second flow path extends through the tubular member that extends through the central member, wherein the tubular member that extends through the central member is configured to direct a second fluid to the chamber, and wherein the first flow path is fluidly decoupled from the second flow path and the chamber; and wherein translation of the slidable member adjusts a K-factor of the nozzle.

* * * * *